United States Patent
Alsberg et al.

(10) Patent No.: US 11,885,508 B2
(45) Date of Patent: Jan. 30, 2024

(54) RESPONSE SLOPE BASED HYDRONIC CONTROL SYSTEM AND METHOD

(71) Applicant: Warmboard, Inc., Capitola, CA (US)

(72) Inventors: Terry Wayne Alsberg, Capitola, CA (US); David Diepersloot, Scotts Valley, CA (US)

(73) Assignee: Warmboard, Inc., Aptos, CA (US)

( * ) Notice: Subject to any disclaimer, the term of this patent is extended or adjusted under 35 U.S.C. 154(b) by 633 days.

(21) Appl. No.: 17/028,766

(22) Filed: Sep. 22, 2020

(65) Prior Publication Data

US 2021/0088231 A1   Mar. 25, 2021

Related U.S. Application Data

(60) Provisional application No. 62/904,537, filed on Sep. 23, 2019.

(51) Int. Cl.
*F24D 19/10* (2006.01)
*F24D 3/02* (2006.01)
(Continued)

(52) U.S. Cl.
CPC .......... *F24D 19/1048* (2013.01); *F24D 3/02* (2013.01); *F24D 3/1066* (2013.01);
(Continued)

(58) Field of Classification Search
CPC ...... F24D 19/1048; F24D 3/02; F24D 3/1066; F24D 2220/0228; F24D 2220/042;
(Continued)

(56) References Cited

U.S. PATENT DOCUMENTS 5,718,372 A * 2/1998 Tishler .................... F24F 11/62
236/11
2008/0277488 A1   11/2008 Cockerill
(Continued)

FOREIGN PATENT DOCUMENTS

EP    3382490 A1 * 10/2018  ......... F24D 19/1006
JP    H06-257819 A * 3/1993  .............. F24F 11/02
(Continued)

OTHER PUBLICATIONS

PCT International Search Report and Written Opinion, PCT Application No. PCT/US20/52042, dated Dec. 14, 2020, 17 pages.
(Continued)

*Primary Examiner* — Michael W Choi
(74) *Attorney, Agent, or Firm* — Fenwick & West LLP

(57) ABSTRACT

A heating system is configured to optimize the speed and accuracy of the system in achieving various ambient air temperature setpoints, by modulating the heated water supply water setpoint to optimize the slope of the system's response curve. Optimized response curves are automatically determined by analyzing differences between ambient air temperatures over time in response to modulated supply water temperatures as they are reset upward or downward to achieve response times prioritized for improved occupant comfort. The controller of the heating system calculates a temperature slope, and adjusts the supply water setpoint to increase/decrease the speed of ambient temperature rise to achieve a desired slope.

16 Claims, 3 Drawing Sheets

(51) Int. Cl.
*F24D 3/10* (2006.01)
*G05B 19/042* (2006.01)
*F24H 15/254* (2022.01)
*F24H 15/176* (2022.01)
*F24H 15/174* (2022.01)
*F24H 15/355* (2022.01)
*F24H 15/156* (2022.01)
*F24H 15/281* (2022.01)

(52) U.S. Cl.
CPC ......... *F24H 15/174* (2022.01); *F24H 15/176* (2022.01); *F24H 15/254* (2022.01); *F24H 15/355* (2022.01); *G05B 19/0426* (2013.01); *F24D 2220/0228* (2013.01); *F24D 2220/042* (2013.01); *F24D 2220/044* (2013.01); *F24D 2220/2081* (2013.01); *F24D 2240/00* (2013.01); *F24H 15/156* (2022.01); *F24H 15/281* (2022.01); *G05B 2219/2614* (2013.01)

(58) Field of Classification Search
CPC ....... F24D 2220/044; F24D 2220/2081; F24D 2240/00; G05B 19/0426; G05B 2219/2614; G05B 19/042
See application file for complete search history.

(56) References Cited

U.S. PATENT DOCUMENTS

| | | |
|---|---|---|
| 2010/0262298 A1 | 10/2010 | Johnson et al. |
| 2011/0218691 A1 | 9/2011 | O'Callaghan et al. |
| 2012/0183014 A1* | 7/2012 | Larsen ................ F24D 19/1009 374/141 |
| 2012/0291468 A1* | 11/2012 | Kato ........................ F24F 11/30 62/185 |
| 2013/0048745 A1 | 2/2013 | Johnson et al. |
| 2019/0086108 A1 | 3/2019 | Okita et al. |

FOREIGN PATENT DOCUMENTS

| | | |
|---|---|---|
| WO | WO 2012/037291 A2 | 3/2012 |
| WO | WO 2014/088418 A1 | 6/2014 |

OTHER PUBLICATIONS

Tekmar, "Installation & Operation Manual: tekmarNet2 House Control 403," May 2013, pp. 1-32.

* cited by examiner

RESPONSE SLOPE BASED HYDRONIC CONTROL SYSTEM AND METHOD

CROSS-REFERENCE TO RELATED APPLICATIONS

This application claims priority to U.S. Provisional Patent Application No. 62/904,537, filed on Sep. 23, 2019, the contents of which are hereby incorporated by reference herein in their entirety.

BACKGROUND

The present disclosure generally relates to heating systems, and specifically relates to modulating a setpoint of heated water supplied to a hydronic heating system.

A purpose of any heating system is to condition habitable space to the ambient temperature desired by its occupants for the maximum comfort of those occupants. It is a secondary purpose to provide that comfort in an energy efficient manner.

In a hydronic system (hot water heating), during approximately steady state conditions, the heat supplied to a habitable space should closely match the heat lost from said space, in order to maintain the ambient air temperature within the range desired by the occupants for maximum comfort. The heat supplied may be a function of the difference ($\Delta T$) between the temperature of the water supplied by a heated water source, the temperature of the water returned to the heat source, and the quantity of water pumped to the heat emitter in the space. The heat emitter may be a radiant floor, wall or ceiling panel, a wall radiator or a baseboard radiator, for example.

Traditionally, heated water sources had a fixed setpoint for the temperature of water supplied which required accurate heat loss analysis be performed on a habitable structure. This process required assumptions regarding the assumed outdoor temperatures, surface areas of exterior walls and their assumed aggregate R-values (a material's resistance to heat flow), surface areas of glazing and their assumed R-values, assumptions regarding R-values of floor coverings and assumptions about the performance of infiltration/exfiltration controls, from which a predicted heating model was generated. The accuracy of this model depended on the accuracy of all of the attendant assumptions. Given the inherent potential for inaccuracies in the assumptions, the model often reflected these inaccuracies.

SUMMARY

Embodiments relate to a heating system configured to optimize the speed and accuracy of the system in achieving various ambient air temperature setpoints. It achieves this objective by modulating the heated water supply water setpoint to optimize the slope of the system's response curve. Optimized response curves are automatically determined by analyzing differences between ambient air temperatures over time in response to modulated supply water temperatures as they are reset upward or downward to achieve response times prioritized for improved occupant comfort.

An object of embodiments of the disclosure is improving occupant comfort by ensuring that the desired ambient air temperature setpoint for a conditioned area is maintained as timely and accurately as possible regardless of the use of the thermostat setback function and/or changing heat loads. Another object of embodiments is to provide the primary comfort function in as energy efficient fashion as is consistent with the primary object. Another feature of embodiments is that the supplied water setpoint is automatically adjusted to the optimum value, without the need for potentially flawed modeling by a skilled technician, but instead is set by analysis by the controller of actual real time empirical data reflecting actual temperature measurements over time.

In some embodiments, a heating control system comprises a water heating device configured to provide heated water for heating one or more conditioned zones, and one or more thermostats, each thermostat configured to measure a temperature of a respective conditioned zone of the one or more conditioned zones in real-time. The heating system further comprises a a controller configured to receive, from the one or more thermostats, real-time temperature data of the one or more conditioned zones. The controller is further configured to determine, using the received temperature data, a real-time temperature change rate or slope of a selected conditioned zone of the one or more conditioned zones, and to adaptively adjust the output temperature of the water heating device based on a deviation between the determined temperature rate change or slope and a desired temperature rate change or slope, to optimize a speed of response for controlling the selected conditioned zone at a desired temperature.

DETAILED DESCRIPTION

Figure 1:
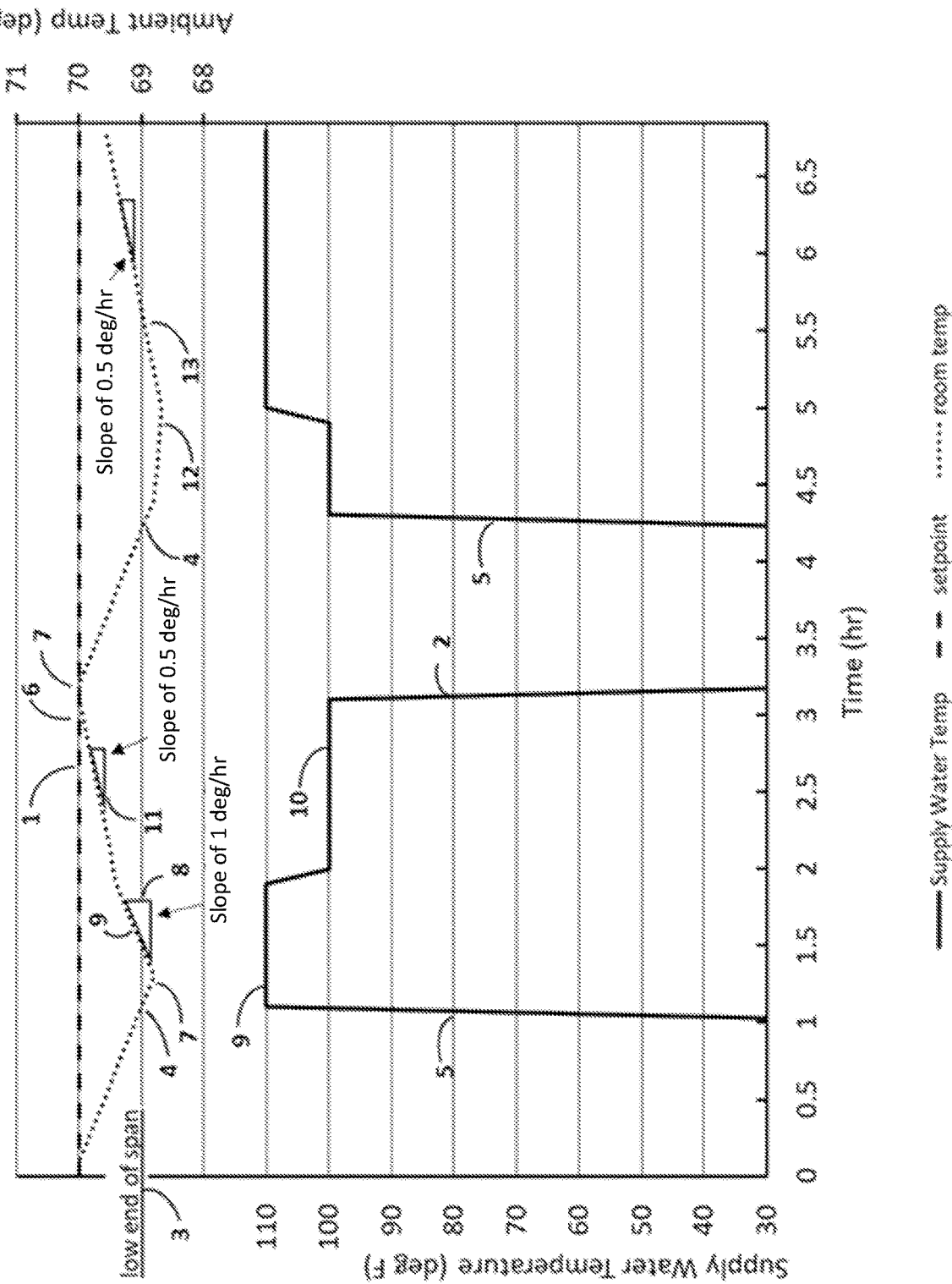
FIG. 1 is a graph of an example of a heating system operating at near steady state conditions, in accordance with some embodiments.

Determining the needed supply water temperature has been a factor in the design, installation and operation of hydronic systems. In many hydronic heating systems, the installer adjusts the heated water source to a single setpoint that might be needed on what was predicted by the model to be the mean coldest night of the winter. It is often the case that the errors in the assumptions would cause less than adequate heating which would occasion one or more revisits by the installer to adjust the setpoint. Even once the correct maximum setpoint was arrived at, either on the first or subsequent iterations of adjustment, a single fixed heat source setpoint meant that when there are hours or days of reduced heat loss, energy would be wasted heating supplied water to a higher than needed level. Another failing of a single setpoint is that water heated above the level needed at a given time would cause the thermostats controlling the system to cycle off and on quite frequently, thereby putting stress on and reducing the life expectancy and reliability of various system components. These inherent challenges of the traditional single set point method have occasioned new control strategies.

An improved approach to resetting heating appliance supplied water setpoints, to more closely match the changing needs of a conditioned area as outdoor air temperatures change through the heating season, has been to have an outdoor air temperature sensor which can be used to reset the heat source setpoint downwards as heat loss varies downward from its predicted maximum. This control method, known as outdoor reset in the industry, still has limitations. It still requires a skilled technician to model the heat loss and set the heated water source's highest predicted set point with all of the inherent potential errors and iterative process noted above. Because the predictive heat loss model may deviate from actual empirical heat loss, it may be set too high for optimum energy efficiency or too low, which might result in inadequate levels of heat supplied. It also fails to account for factors affecting heat loss beyond varying outdoor ambient air temperature such as solar gain, occupancy levels, changes in interior lighting, heat generated by cooking, fireplace operation, opening of windows for ventilation and/or other factors which cannot be accounted for by outdoor reset.

More recently, there have been developed control methods based predominately on the on/off activity of thermostats. The typical thermostat in essence operates as a simple on/off switch. This activity-based control method takes note of the timing of on/off signals from a thermostat sent typically to the controller through a pair of 24 volt wires, to control the initiation of flow or cessation of flow of heated water to the conditioned area controlled by that thermostat. This approach seeks to optimize energy efficiency by always driving the supplied water setpoint downward based on the activity of a thermostat or multiple thermostats. When supplied water temperatures are lower, the percentage of time that water must be circulated to a habitable space must increase. Accordingly, this general approach seeks to have the system at or near constant flow for lowest possible supply water set point which results in the lowest energy usage.

The problem in this approach is that hydronic systems generally, and the current most popular hydronic systems, which use radiant floor panels as the emitters, have been notoriously slow to respond to the changing heat supply needs of a heating system. Constant circulation of comparatively low temperature supplied water means that there is little or no reserve heat capacity in the supplied water as may be required to change ambient air temperature when needed or to react to changing heat loads as needed. As a consequence, "setback" thermostat operation has typically produced less than satisfactory comfort due to long delays in reaching the desired ambient air temperature under dynamic conditions.

The setback function on a thermostat is typically used to save energy by reducing ambient air temperature during the hours that the occupants are either sleeping at night, not at home during the day or away from the home for extended periods, e.g., on vacation. Vacation setback is particularly problematic because the ambient temperature setpoint is set to a comparatively low level, e.g., intended merely to keep pipes from freezing. The conventional wisdom in the radiant panel industry is to entirely avoid using the setback function due to the unacceptably long periods of recovery from setback. This slow response would mean that the occupants would have to endure hours or days of less than desired ambient temperatures during the recovery from setback before the habitable space reaches a comfortable ambient air temperature. Paradoxically, the strategy of always driving supplied water temperature downward to achieve near constant flow in order to save energy can actually have the reverse effect of obviating the possibility of employing the energy saving advantages of the setback function. By, in effect, rendering inoperable the energy saving set back function they are also compromising the primary function of comfort which requires that the habitable space must be at the occupant desired temperature the greatest proportion of time.

An analogy for this problem is that the horsepower needed by a car to maintain speed on a level road is considerably lower than that needed to accelerate from a stop, climb a hill or pass a car. Low horsepower may be fine for energy efficiency under steady state conditions but does not provide for an enjoyable or even safe driving experience under dynamic conditions. Similarly, low temperature in a hydronic system may optimize energy usage but at the sacrifice of the primary purpose of a heating system, which is to have the habitable space at or near the desired temperature for the greatest percentage of operational time, whether asleep, awake or away from the home.

Some embodiments described herein relate to a heating system (e.g., a hydronic system) configured to optimize occupant comfort by improving or maximizing the time that the heating system operates to maintain a conditioned area at the occupant's desired ambient air temperature range, even if there is some short-term sacrifice of energy efficiency in doing so. In some embodiments, the system does so by using measured ambient air temperature data over time from a thermostat or multiple thermostats to optimize the supplied water set point to achieve fast and accurate control of the heating system, thereby maintaining a conditioned area at the desired ambient air setpoints, where such setpoints may change throughout the day or even when using nighttime, daytime or vacation setback.

In some embodiments, the heating system adaptively adjusts the supply water temperature for heating one or more conditioned areas (e.g., rooms within a house, also referred to as "conditioned zones") in order to maintain the temperature of a conditioned area within a desired span in an energy efficient manner, as well as allow for the conditioned area to be quickly heated from a lower temperature to the desired set temperature (e.g., during setback function, and/or due to changes in heat load). The heating system comprises a controller that receives temperature data from one or more thermostats. Each thermostat may correspond to a conditioned area of the one or more conditioned areas. The controller employs a CPU and an algorithm to analyze an ambient temperature response (e.g., a slope) to a given supplied water temperature in real time, based upon the received temperature data. Because the algorithm needs accurate temperature data to perform its analysis of response slope, the typical thermostat, which only sends on/off signals, while adequate for activity based control methods, but may be insufficient for the slope based analysis performed by embodiments herein. Therefore, embodiments use thermostat(s) with the control system that are capable of sending reasonably accurate real time temperature data to the controller. With this data, the controller can calculate the real-time slope of response based on the rate of $\Delta T$ variation of the current ambient temperature of the conditioned area, relative to the setpoint temperature for that thermostat over time. For example, in some embodiments, each thermostat may be configured to measure and send to the controller a current temperature on its zone once per minute, and the controller may be configured to determine a slope once every 12 or 15 minutes.

In some embodiments, thermostats of the heating system operate over a range defined by an upper temperature which occasions an "off" signal and a lower temperature which occasions an "on" signal. The term in the heating industry for this range is "span". During normal near steady state operation, where the thermostat operates in a normal span, which may typically be one, two, three or more degrees Fahrenheit, the controller operates to ensure that the slope of the temperature rise from the low temperature setpoint of the span to the high temperature setpoint of the span is optimized primarily for accuracy and speed of control in maintaining the ambient temperature within the span of the thermostat, by calculating the current rate of temperature rise (also referred to as temperature slope) of a conditioned zone given the current supplied water temperature. In some embodiments, the controller calculates a temperature slope periodically (e.g., every 12 minutes or every 15 minutes) based on temperature data measured by the thermostat within a conditioned zone. In other embodiments, the controller, after a certain fraction of a degree rise in ambient temperature of the conditioned zone (e.g., 0.1 degrees), extrapolates an amount of time to reach the high point of the span. In some embodiments, the controller determines the temperature slope based on temperature measurements over a predetermined period of time or the temperature measurements indicating at least a predetermined change in the ambient temperature since a previous slope determination, whichever occurs first. In some embodiments, the controller determines slope by analyzing the temperature of a conditioned zone at the beginning and end of a measurement period (e.g., 15 minute period), or may determine the slope based on a function that best fits a plurality of temperature measurements during the period. In some embodiments, because it may take some time for water temperature change to take effect following a signal from the controller to set a new setpoint temperature, the controller may restrict how often the temperature setpoint is changed (e.g., once every 12 minutes or every 15 minutes), to more gently progress the rate of temperature change towards the desired rate/slope.

If the rate of rise is insufficient for the goal of comfort (e.g., the determined rate being less than a desired slope), the controller increases the supply water setpoint, to increase the speed of ambient temperature rise. Conversely, if the slope of temperature rise is greater than needed for accurate control, the supply water setpoint is decreased thereby achieving the secondary object of energy efficiency consistent with the primary object. In some embodiments, the desired slope should be positive whenever heated water is being circulated to a particular area/zone, in order to maintain the ambient temperature within the desired span.

Further, when the range of temperature rise required is greater than the normal degrees of span typical of steady state operation, for example when there is a rapid increase in heat load causing the ambient temperature to fall well below the lower setpoint of the span in spite of heated water being circulated, or when the setback function is in operation, the controller algorithm increases the supply water setpoint temperature above such temperature as may be required for near steady state performance, to achieve a higher temperature change slope in comparison to the desired slope for when in steady state operation. This allows for the heating system to quickly heat a controller area to within the desired temperature span, in order to maintain occupant comfort, at the temporary expense of energy efficiency.

In some embodiments, the controller further takes note of the negative slope of the temperature curve from the maximum temperature of the span to the minimum temperature within that span during those time periods when no heated water is circulated. The rate at which the temperature falls is an empirical measurement of the heat loss during the time period of the decline in temperature to the lower limit of the span. The controller then compares that decline to previous instances of decline (e.g., maintained in a memory of the controller) and can further adjust the setpoint temperature as needed to provide more constant and accurate performance within the span that the user selects when adjusting the thermostat to a particular desired ambient air temperature. For example, if the controller determines that the negative temperature slope of a conditioned zone when no heated water is being circulated has increased relative to previous periods of non-circulation, the controller may infer that heat loss of conditioned zone has increased, and in response adjust the setpoint temperature upwards in order to maintain the desired temperature slope when heated water is circulated again. In addition, changes in negative slope of conditioned zones may be used by a user to assess sources of heat loss, such as open windows, damaged insulation, etc. For example, a determination by the controller that a particular conditioned zone is exhibiting a higher negative temperature slope relative to other conditioned zones may be used to diagnose a particular room of a house as a primary source of heat loss within the house.

FIG. 1 is a graph of an example of a heating system operating at near steady state conditions, in accordance with some embodiments. In the example depicted in FIG. 1, the set point 1 of a conditioned zone is set to 70°. When the ambient air temperature reaches 70°, an "off" signal 2 is sent to the controller which causes the cessation of heated water circulation. In addition, the conditioned zone is associated with a set lower limit, where heat is turned on if the air temperature of the room falls below said lower limit. In the example shown in FIG. 1, the lower limit 3 of the span is 69°. This would be termed a +0, −1 span. It is understood that other set points and spans can be used (e.g., +1, −1 span, +0, −2 span, etc.).

When there is a call for heat 4 (due to the room temperature falling to 69° air temperature as measured by the thermostat's air temperature sensor) an "on" signal is sent to the controller causing water of a certain temperature to be circulated 5 through the system until the room air temperature reaches the set point temperature 70° (6), and therefore the thermostat calls for the water flow to cease (2).

In some embodiments, even though there has been a call to circulate heated water 5, the ambient air temperature may fall slightly below the lower point of the span 7 for a period of time. This is known in the industry as "undershoot". Undershoot tends to occur because after the controller calls for heat there may be some delay to actually deliver heated water to the conditioned area, as well as the inertia of the thermal masses in the conditioned area. Undershoot has been a routinely experienced flaw of hydronic heating systems due to their slow response. In some embodiments, the controller is configured to reduce undershoot to ensure that the desired ambient temperature is maintained within the desired span the greatest amount of time, by initially setting a water temperature to achieve a slope of the response curve 8 being somewhat steeper than may be required for energy efficient near steady state operation.

In this example, the initial supplied water temperature is set at 110° (9). Because the sensor in the thermostat can measure comparatively small temperature changes, within a few minutes the algorithm can calculate the response slope 8 of the conditioned zone. As the graph indicates, the steepness of the slope at 110° supplied water temperature rapidly overcomes the thermal inertia, reversing the undershoot and causing the ambient temperature in the conditioned area relatively quickly rise above lower limit of the span 3.

After the controller notes that the ambient air temperature is above the lower temperature setpoint of the span, that the system is operating within the required range of comfortable ambient temperature, the controller may then reset the supplied water temperature downward to a lower temperature 10 (e.g., 100°), thereby reducing the response slope 11. This lower response slope may correspond to a desired temperature slope, and the lower water temperature needed to maintain this lower slope is a more energy efficient supplied water setpoint that is nonetheless consistent with the primary objective of maintaining the space in the occupant desired range of temperature needed for comfort. Once the setpoint 6 is reached, the thermostat sends an "off" signal to the controller causing a cessation of circulation 2.

In some embodiments, if the lower slope resulting from the controller setting the supplied water temperature downwards to a lower level does not match the desired temperature slope, the controller may further adjust the supplied water temperature upwards or downwards to achieve a temperature slope that more closely aligns with the desired slope. In some embodiments, the controller may adjust the supplied water temperature by a set amount. In other embodiments, the controller determines an amount of adjustment based upon a deviation between the desired slope and the actual slope determined from the thermostat temperature measurements. In addition, the controller may base the temperature adjustment on one or more additional factors, such as one or more previously determined heat loss parameters, e.g., based on previously measured negative slopes as discussed above, and/or the like.

In some embodiments, the desired temperature slope is set to a predetermined value (e.g., 0.5° rise per hour), or may be determined based upon a desired length of time for the temperature of the conditioned zone to rise from the lower end of the span to the higher end. In this example, the temperature sensor in the thermostat, when the water temperature is set to the lower temperature 10, reads a 0.1° rise in temperature from 69.0° to 69.1° in twelve minutes. The controller, using the time and temperature data, calculates that it would take two hours for the 69° conditioned area air temperature to rise to 70°. In this example, the controller will determine that the low but positive slope is within the optimum operational range and therefore the existing water supplied set point will be maintained. In this example, the two hour time that hot water is circulated is close to a constant flow condition which is optimum for both comfort and energy efficiency. In some embodiments, the desired temperature slope may correspond to a range (e.g., between 0.4° and 0.6° per hour, a slope that results in temperature rise from the lower end to the higher end of the span in between 1.75 and 2.25 hours, etc.).

As the system continues to operate, once the temperature falls to the lower end of the span 4, again there is a signal sent from the thermostat to the controller to circulate heated water 5. In the case illustrated in FIG. 1, the 100° water of the previous supply water setpoint is insufficient to turn the slope positive. This is because in the present example, due to various changes in conditions, heat loss has increased and therefore not only does the slope not become positive, it remains negative 12. The ambient air temperature, for example, stops rising and instead falls by 0.1° from to 68.8° to 68.7° while hot water is still being circulated at 100°. The controller calculates that the slope has turned negative and increases the supplied water set point, by 10° in this example. In this example, if after twelve minutes the temperature has risen back to 69.5° and continues to rise at a similar slope thereafter 13, the new adjusted supplied water setpoint is maintained and the system returns to a condition of comfort and energy efficiency.

Conversely, in the present example, if due to decreasing heat loss, the temperature begins to rise faster than perhaps 0.1° in twelve minutes but instead does so perhaps in six minutes, the controller will determine that the slope is too steep and will reduce the set point of the supplied water, e.g., by 5°. If the new slope of the response curve is now in the optimum range for comfort and energy efficiency, the new adjusted supplied water setpoint is maintained and the system returns to a condition of comfort and energy efficiency.

By this iterative process, the setpoint of the supplied water is adjusted upwards or downwards as required to ensure that the conditioned area controlled by the thermostat is nearly always rising slowly from the low point of the span to the high point of the span.

As such, the controller is able to adaptively adjust the water temperature set point of the heating system in response to changing conditions by measuring the ambient temperature of the conditioned zone and determining the temperature slope, in order to achieve a desired temperature slope that results the temperature of the conditioned zone rising between the high and low points of the span within a desired time range (e.g., 2 hours to span, or 0.5° per hour in the example illustrated in FIG. 1). In addition, the system operates without the need for modeling heat loss or ideal response curves and/or the recording of previous response curves in order to set an ideal set point temperature of a water heating device, instead measuring ambient temperature of a conditioned zone over time (e.g., once per minute for 12 minutes, or until at 0.1° change in temperature is observed) to determine a current rate of temperature gain or loss of the zone, and adjusting the water temperature to achieve the desired temperature change rate or slope. For example, as illustrated in FIG. 1, as heat loss conditions of a conditioned zone change, the controller adaptively adjusts the water heating temperature to meet the desired slope. This may be performed without the need to measure outside air temperature or temperature of the water returned to the heat source, as the controller is able to adjust the water temperature based on the current ambient temperature and temperature change rate of the conditioned zone.

Figure 2:
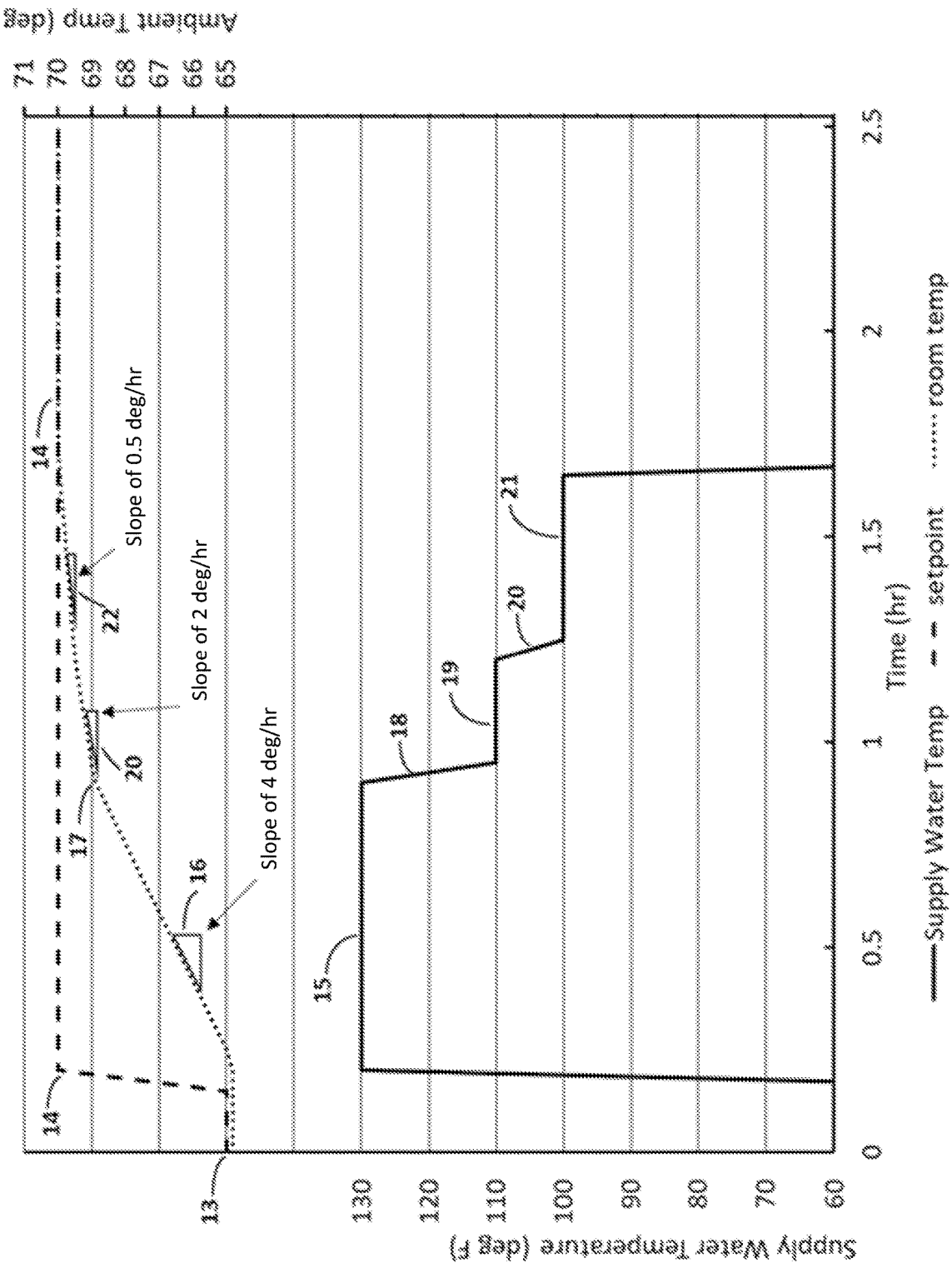
FIG. 2 is a graph of an example of a heating system returning from setback condition to achieve near steady state operation at a fast rate, in accordance with some embodiments.

FIG. 2 is a graph of an example of a heating system returning from setback condition to achieve near steady state operation at a fast rate, in accordance with some embodiments. In some embodiments, when a conditioned space returns from setback, a steep response slope reflecting many degrees of rise over a comparatively short period of time may be desirable. For example, the most common setback operation is called nighttime setback. As but one possible example, it may be desirable for purposes of comfort and energy efficiency to have bedrooms or even a whole structure be reduced in temperature to operate at a reduced ambient air temperature setpoint 13 (e.g., 65°) at nighttime while sleeping, only to return to a more normal daytime setpoint 14 of 70° when the occupants awake in the morning. A response slope typical of near steady state performance, as in a rise of 1° over perhaps two hours, would take far too long, in this case ten hours, to achieve the desired daytime setpoint.

In this example, the controller may, responsive to the temperature data supplied by the thermostat, reset the supplied water set point to a highest safe operating temperature 15, which in this example is 130°, thereby occasioning the steepest possible recovery slope 16 from nighttime setback, greatly accelerating the return of the conditioned area to the desired daytime ambient air temperature. This significantly higher water temperature will cause some loss of energy efficiency but only for a comparatively short period time during the recovery from nighttime setback. The tradeoff is in maximizing the time that the conditioned space is at the temperature needed for comfort while also making possible the offsetting energy efficiency gains made possible by nighttime setback itself. Once the ambient temperature has reached the lower temperature 17 of the desired daytime span, the algorithm resets the temperature downward 18. In this example, the supplied water temperature 19 is reset to 110°. The controller may then calculate an updated response slope of the conditioned area based on the lower supplied water temperature, and further adjust the water temperature as needed. For example, as shown in FIG. 2, the controller may calculate that even at a 20° lower set point, while comfort has been achieved (e.g., the temperature of the conditioned area is within the desired span), the slope 20 is nonetheless too steep for energy efficiency, and the controller therefore resets the supplied water set point 20 downward 21 to achieve a 0.5° per hour slope 22 for optimized energy efficiency consistent with the primary objective of accurate control within the desired span for optimum comfort.

In some embodiments, a heating system may utilize multiple thermostats to control multiple conditioned areas (e.g., different rooms). When multiple thermostats are utilized in a system, the controller may continuously sample the response time or slope of the various zones controlled by individual thermostats. The zone with conditions that require the highest water temperature may be designated as the priority zone for the setting of the supply water set point. The priority zone may change over time as factors affecting the heating load change from zone to zone over time.

Figure 3:
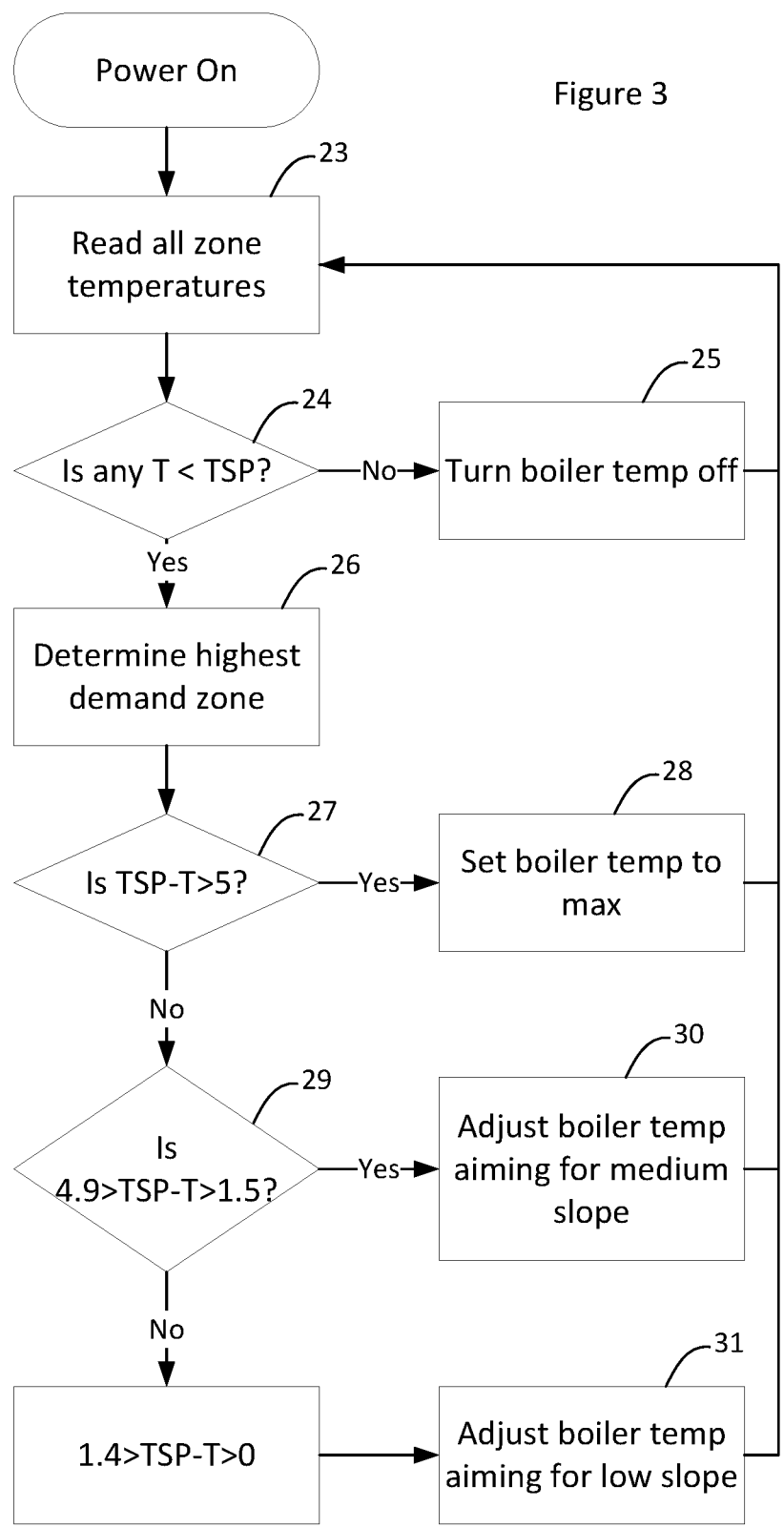
FIG. 3 depicts a flowchart of a process that determines the supplied water set points required to achieve optimum slope of response to maintain the ambient temperature that the provides the greatest comfort over time, in accordance with embodiments.

FIG. 3 depicts a flowchart of a process that determines the supplied water set points required to achieve optimum slope of response to maintain the ambient temperature that the provides the greatest comfort over time, in accordance with some embodiments. After powering up, the controller reads 23 the temperature(s) reported by the thermostat(s) relative to the thermostat set point (TSP) in one or more conditioned areas (zones). The controller determines 24 if the desired ambient area temperature in all zones is greater than the thermostat set point, e.g., T>TSP for all zones. If so, the heat source is powered off 25. On the other hand, if T<TSP for one or more zones, the controller determines 26, based on the received temperature data from the thermostats for each zone, which zone has the greatest ΔT, in other words, highest demand, which may be designated as the "priority" zone. In some embodiments, if all zones are within the span, the priority zone may correspond to a zone exhibiting a lowest slope relative to the desired slope.

The controller may set the heated water temperature setpoint to achieve a desired temperature response slope for the determined zone, based upon a deviation between the temperature of the zone T and the desired temperature set point TSP. In some embodiments, the controller determines 27 if the ambient air temperature for the determined conditioned area is less than the thermostat set point, e.g., T<TSP, and the difference (delta) is more than a first value which may be set value, e.g., five degrees (or other predetermined value) or a value that changes depending on, for example, feedback from the system. If so, the controller resets 28 the heated water setpoint to a maximum. In some embodiments, that setpoint is maintained until the ambient temperature reaches the temperature which is set as the low end of the thermostat's span. In the example illustrated in FIG. 3, the low end of the span is 1.5 degrees, however, it is understood that this value can be set to any value and, in some embodiments, can change by, for example, a user and/or feedback from the system. Thereafter, the algorithm adjusts the supply water temperature upwards or downwards to achieve a low but positive slope to the response curve.

If the controller determines 29 that the ambient air temperature for a conditioned area is less than the thermostat set point, i.e. T<TSP, and the difference is less than the first value (e.g., 5 degrees) but is greater than a second value (e.g., 1.5 degrees, although it is understood that other values may be used), the controller may adjust 30 the supply water setpoint to achieve an initial steep slope that is greater than the desired steady state slope for when the temperature of the zone is within the desired span, but may be less than the slope that would result from setting the supply water setpoint to a maximum temperature (e.g., as at 28). For example, as shown in FIG. 2, where the desired steady state slope is 0.5 degrees per hour, the water supply setpoint may be set to achieve an initial steep slope of 2 degrees per hour. In some embodiments, the initial steep slope is maintained until the low temperature of the span is achieved and thereafter, the supply water setpoint is progressively reduced until a low but positive slope 31 to the response curve is determined by the algorithm.

If the controller determines that the ambient air temperature for the conditioned area is within the desired span (e.g., within 1.5 degrees of the temperature set point, in the example of FIG. 3), the controller adjusts 31 the supply water setpoint to achieve a low steady state slope (e.g., 0.5 degrees per hour), to maintain the temperature of area at a comfortable level while being energy efficient.

In some embodiments, the first and second values may be predetermined values, and/or may be based upon a value of the temperatures setpoint. In addition, although FIG. 3 illustrates different supply water setpoints set based upon first and second temperature difference threshold values, it is understood that in other embodiments, additional or fewer temperature difference threshold values may be used, associated with different temperature change slopes.

In some embodiments, following a setback event in which the temperature setpoint of the thermostat is raised, an initial difference of the temperature of the conditioned zone from the temperature setpoint may be used to determine the water temperature setpoint until a threshold temperature (e.g., the low end of the span, or 1.5 degrees in the example of FIG. 3) is reached. For example, if the temperature of the conditioned zone is less than the temperature setpoint by at least the first value (e.g., 5 degrees), the boiler temperature may be set to a maximum until the ambient temperature reaches the temperature which is set as the low end of the thermostat's span, even when the temperature of the conditioned zone rises to be within than the first value but is greater than the second value from the temperature setpoint (e.g., between 1.5 and 5 degrees less than the setpoint), in order to minimize an amount of time needed for the conditioned zone to reach the desired span, after which the controller adjusts the supply water temperature upwards or downwards to achieve a low but positive slope to the response curve.

In other embodiments, the controller is configured to adjust the supply water setpoint as the ambient temperature of the conditioned area nears the setpoint temperature to achieve different temperature change slopes, e.g., based on temperature difference threshold values. This may be performed in systems where the heating panels have a slow response to temperature change (e.g., due to material or mass, such as systems using concrete slabs panels), where if the supply water temperature is set to achieve a high temperature change slope, the temperature of the conditioned area may overshoot the desired setpoint even after the water supply temperature is lowered when the conditioned area reaches the lower end of the span. By reducing the supply water setpoint to reduce the temperature change slope as the ambient temperature of the conditioned zone nears the span (such as by reducing the water temperature to achieve a medium temperature change slope when the temperature is between a first and second value from the setpoint, as shown in FIG. 3), the temperature of the conditioned zone may reach the lower end of the span with a gentler slope and avoid overshooting the setpoint temperature.

If multiple thermostats (zones) are employed in a system, the controller may sequentially scan each zone, and notes the zone that has the highest temperature difference between ambient temperature and thermostat set point. Through this operation by the controller and its algorithm, comfort is prioritized. Once comfort is achieved energy efficiency considerations control. In some embodiments, the controller repeats the process periodically (e.g., every 12 minutes, every 15 minutes, etc.), so that any zones that fall outside the desired temperature span can be quickly brought up to a comfortable level.

As discussed above, the controller adjusts the water temperature setpoint of the heating system based on the determined real-time temperature change rate or slope within the conditioned zone and a deviation between a measured temperature and the desired temperature set point of the zone. This allows for the controller to control the water temperature to cause the temperature of the zone to rise at a high rate when the temperature is below the span, to quickly bring the temperature of the zone to a comfortable level, while, once the temperature of the zone is within the span, lower the temperature to reduce the rate of temperature rise to a lower desired slope, increasing energy efficiencies while maintaining the temperature of the zone within the span for a longer period of time. As such, the speed of response of the heating system is optimized so as to have the conditioned zone accurately controlled at the desired temperature range for a maximum possible duration, whether the system is operating in steady state or when a dynamic change in temperature is required (e.g., due to rapidly changing conditions affecting the heating load of the zone, or programming of the thermostat to change a temperature of the zone).

While the above description used a radiant floor, similar examples may be used to illustrate embodiments in a radiant wall, ceiling panel, wall radiator or a baseboard radiator, for example.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A heating control system comprising:
    a water heating device configured to provide heated water for heating one or more conditioned zones;
    one or more thermostats, each thermostat configured to measure a temperature of a respective conditioned zone of the one or more conditioned zones in real-time;
    a controller configured to:
        receive, from the one or more thermostats, real-time temperature data of the one or more conditioned zones;
        determine, using the received temperature data, a real-time temperature change rate of a selected conditioned zone of the one or more conditioned zones;
        set a desired temperature change rate based on a deviation between a measured temperature of the selected conditioned zone and a desired temperature of the selected conditioned zone, by setting the desired temperature change rate based on a first slope if the measured temperature of the selected conditioned zone is within a temperature span based on the desired temperature of the selected conditioned zone, and setting the desired temperature change rate based on a second slope larger than the first slope if the measured temperature is outside the temperature span;
        adaptively adjust an output temperature of the water heating device based on a deviation between the determined temperature change rate and the desired temperature change rate, to optimize a speed of response for controlling the selected conditioned zone at the desired temperature.

2. The heating control system of claim 1, wherein the controller is further configured to select a conditioned zone of the one or more conditioned zones having a largest deviation between a measured temperature of the zone and a set temperature of the zone as the selected condition zone, based upon the received real-time temperature data.

3. The heating control system of claim 1, wherein the controller is further configured to determine the real-time temperature change rate of the selected conditioned zone and adaptively adjust the output temperature based on the determined real-time temperature change rate periodically.

4. The heating control system of claim 1, wherein the controller is further configured to adjust the output temperature to a maximum set point responsive to a measured temperature of the selected conditioned zone being lower than the desired temperature by over a threshold amount.

5. The heating control system of claim 1, wherein controller is configured to receive, from each of the one or more thermostats, real-time temperature data measured by the thermostat once per minute.

6. The heating control system of claim 5, wherein the controller is configured to determine the real-time temperature change rate of the selected conditioned zone every 12 minutes, or responsive to the received real-time temperature data indicating a change of 0.1 degrees since a previous real-time temperature change rate determination.

7. The heating control system of claim 1, wherein the desired temperature change rate is 0.5 degrees Fahrenheit per hour.

8. The heating control system of claim 1, wherein the controller is further configured to:
    determine a declining temperature slope of a conditioned zone of the one or more conditioned zones, based upon temperatures of the zone as measured by a respective thermostat of the one or more thermostats during a period when heated water is not circulated to the conditioned zone; and
    determine a real-time heat loss measure based upon the determined declining temperature slope.

9. A method for setting a water temperature of a heating system, comprising:
    receiving, from one or more thermostats, real-time temperature data of one or more conditioned zones during a time period in which heated water of the heating system is circulated to the one or more conditioned zone at a first set temperature;
    determining, using the received temperature data, a real-time temperature change rate of a selected conditioned zone of the one or more conditioned zones responsive to the heated water circulated at the first set temperature;
    setting a desired temperature change rate based on a deviation between a measured temperature of the selected conditioned zone and a desired temperature of the selected conditioned zone, by setting the desired temperature change rate based on a first slope if the measured temperature of the selected conditioned zone is within a temperature span based on the desired temperature of the selected conditioned zone, and setting the desired temperature change rate based on a second slope larger than the first slope if the measured temperature is outside the temperature span;

adaptively adjusting an output temperature of the water heating device from the first set temperature, based on a deviation between the determined temperature change rate and the desired temperature change rate, to optimize a speed of response for controlling the selected conditioned zone at the desired temperature.

10. The method of claim 9, further comprising selecting a conditioned zone of the one or more conditioned zones having a largest deviation between a measured temperature of the zone and a set temperature of the zone as the selected condition zone, based upon the received real-time temperature data.

11. The method of claim 9, wherein:
the real-time temperature data from each of the one or more thermostats is received once per minute; and
determining the real-time temperature change rate of the selected conditioned zone comprises determining a real-time temperature change rate of the selected conditioned zone every 12 minutes, or responsive to the received real-time temperature data of the selected conditioned zone indicating a change of 0.1 degrees since a previous real-time temperature change rate determination.

12. The method of claim 9, wherein the desired slope is 0.5 degrees Fahrenheit per hour.

13. The method of claim 9, further comprising:
determining a declining temperature slope of a conditioned zone of the one or more conditioned zones, based upon temperatures of the zone as measured by a respective thermostat of the one or more thermostats during a period when heated water is not circulated to the conditioned zone; and
determining a real-time heat loss measure based upon the determined declining temperature slope.

14. A hydronic heating control system that eliminates the need for modeling heat loss or ideal response curves in order to set an ideal set point temperature of a water heating device and/or the recording of previous response curves, comprising:
a controller;
one or more system thermostats in a conditioned space comprising one or more conditioned zones, the one or more system thermostats having accurate high resolution temperature sensors which send real time, temperature data for one or more conditioned zones to the controller,
wherein the controller is configured to:
monitor and analyze a real time rate of temperature change in the one or more conditioned zones;
set a desired temperature change rate based on a deviation between a measured temperature of a selected conditioned zone of the one or more conditioned zones and a desired temperature of the selected conditioned zone, wherein the desired temperature change rate is set based on a first slope if the measured temperature of the selected conditioned zone is within a temperature span based on the desired temperature of the selected conditioned zone, and based on a second slope larger than the first slope if the measured temperature is outside the temperature span;
automatically modulate an output temperature of the water heating device based on a deviation between the real time rate of temperature change and the desired temperature change rate to ensure that when a change in temperature of the selected conditioned zone is required based on the programming of the one or more thermostats, speed of response is optimized so as to have the selected conditioned zone accurately controlled at a desired temperature range, whether in steady state operation or when dynamic change in temperature is required by rapidly changing conditions both externally and internally in the conditioned space that affect the heating load of the selected conditioned zone and/or specific programming of the thermostat in said zone.

15. The control system of claim 14 wherein the controller cyclically polls all thermostats in a multiple zone system to determine which zone requires a highest water heating device output temperature, which becomes a priority zone, in order to maximize the length of time that that zone is at its desired temperature, wherein as the highest demand zone may change over time as factors affecting a heating load change from zone to zone over time, wherein through this process the priority zone shall change.

16. The control system of claim 14 wherein accurate empirical heat loss data can be determined in real time by a declining slope of a temperature of a zone or zones as measured by the accurate high resolution sensors in system thermostats and as analyzed by the controller.

* * * * *